(12) United States Patent
Gallant et al.

(10) Patent No.: US 7,702,020 B2
(45) Date of Patent: *Apr. 20, 2010

(54) MULTI-STANDARD VARIABLE BLOCK SIZE MOTION ESTIMATION PROCESSOR

(75) Inventors: Michael D. Gallant, Kitchener (CA); Eric C. Pearson, Conestogo (CA)

(73) Assignee: LSI Corporation, Milpitas, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 11/937,632

(22) Filed: Nov. 9, 2007

(65) Prior Publication Data

US 2008/0063074 A1 Mar. 13, 2008

Related U.S. Application Data

(63) Continuation of application No. 10/669,930, filed on Sep. 24, 2003, now Pat. No. 7,342,964.

(60) Provisional application No. 60/487,643, filed on Jul. 15, 2003.

(51) Int. Cl.
*H04N 7/12* (2006.01)
*G06K 9/36* (2006.01)

(52) U.S. Cl. .................. 375/240.16; 382/236
(58) Field of Classification Search ............ 375/240.16, 375/240.12, 240.26, 240.24; 348/699
See application file for complete search history.

(56) References Cited

U.S. PATENT DOCUMENTS

| 5,608,656 | A | 3/1997 | Purcell et al. | 364/514 R |
|---|---|---|---|---|
| 5,659,364 | A | 8/1997 | Aoki et al. | 348/416 |
| 5,793,443 | A * | 8/1998 | Aoki et al. | 348/699 |
| 6,108,039 | A | 8/2000 | Linzer et al. | 348/398 |
| 6,125,144 | A * | 9/2000 | Matsumura et al. | 375/240.12 |
| 6,198,771 | B1 * | 3/2001 | Iwata | 375/240.16 |
| 6,366,616 | B1 * | 4/2002 | Mizuno et al. | 375/240.24 |
| 6,907,080 | B1 * | 6/2005 | Aldrich | 375/240.26 |

OTHER PUBLICATIONS

Sheu-Chih Cheng et al., "A Comparison of Block-Matching Algorithms Mapped to Systolic-Array Implementation", IEEE Transactions on Circuits and Systems for Video Technology, vol. 7, No. 5, Oct. 1997, pp. 741-757.
Eiji Ogura et al., "A 1.2-W Single-Chip MPEG2 MP@ML Video Encoder LSI Including Wide Search Range (H: ±288, V: ±96) Motion Estimation and 81-MOPS Controller", IEEE Journal of Solid-State Circuits, vol. 33, No. 11, Nov. 1998, pp. 1765-1771.

* cited by examiner

*Primary Examiner*—Gims S Philippe
(74) *Attorney, Agent, or Firm*—Christopher P. Maiorana, PC

(57) ABSTRACT

An apparatus generally having a first circuit and a second circuit is disclosed. The first circuit may be configured to generate a plurality of sum values by adding a plurality of pixel difference values between a current block and a reference block, one of the sum values corresponding to each of a plurality of smallest partitions of the current block. The second circuit configured to (i) generate a plurality of intermediate values from the sum values, one of the intermediate values corresponding to each of a plurality of possible partitions of the current block, (ii) store a plurality of lowest values among the intermediate values as the current block is moved through a search window and (iii) generate a motion signal conveying at least one motion vector based on the lowest values.

24 Claims, 5 Drawing Sheets

MULTI-STANDARD VARIABLE BLOCK SIZE MOTION ESTIMATION PROCESSOR

This is a continuation of U.S. Ser. No. 10/669,930, filed Sep. 24, 2003, now U.S. Pat. No. 7,342,964, which is hereby incorporated by reference in its entirety.

This application claims the benefit of U.S. Provisional Application No. 60/487,643, filed Jul. 15, 2003, which is hereby incorporated by reference in its entirety.

FIELD OF THE INVENTION

The present invention relates to a digital video motion estimation generally and, more particularly, to a multi-standard variable block size motion estimation method and apparatus.

BACKGROUND OF THE INVENTION

Motion estimation is employed to reduce temporal redundancy in digital video compression and is therefore a central part of the MPEG-x and the H.26x video coding standards. Conventional motion estimation computations command 60 to 80% of an encoding computational load. For large picture formats (i.e., standard definition and above) dedicated VLSI-architectures for motion estimation are employed. Numerous architectures exist for fixed block-size motion estimation (FBSME), which is based on a constant, translational motion model with fixed-size image blocks, usually 8 horizontal (H) by 8 vertical (V) or 16 H×16 V samples. A variable block size motion estimation (VBSME) processes, that allows a wider range of block sizes (i.e., 4 H×4 V, 4 H×8 V, 8 H×4 V, 8 H×8 V, 8 H×16 V, 16 H×8 V, and 16 H×16 V), provides better estimation of small and irregular motion fields resulting in a reduced number of bits used for coding prediction errors compared with FBSME. The VBSME process is a common component of motion models in recent video compression standards, such as H.264 and MPEG-4 Part 2, yet motion estimation processors that support VBSME are rare.

Two known VBSME approaches are currently available. A first VBSME approach uses a separate processing step for each block size. However, the first approach expends significant processing resources as a reference search area is traversed repeatedly, once for each block-size. A second VBSME approach operates on a smallest block-size and derives all larger block-size sum of absolute differences (SAD) by summing the corresponding small block-size SADs. Since the intermediate results from the small block-sizes are kept to generate the full block-size SADs, the second approach utilizes significant intermediate storage.

SUMMARY OF THE INVENTION

The present invention concerns an apparatus generally comprising a first circuit and a second circuit. The first circuit may be configured to generate a plurality of sum values by adding a plurality of pixel difference values between a current block and a reference block, one of the sum values corresponding to each of a plurality of smallest partitions of the current block. The second circuit configured to (i) generate a plurality of intermediate values from the sum values, one of the intermediate values corresponding to each of a plurality of possible partitions of the current block, (ii) store a plurality of lowest values among the intermediate values as the current block is moved through a search window and (iii) generate a motion signal conveying at least one motion vector based on the lowest values.

The objects, features and advantages of the present invention include providing a method and/or apparatus for variable block size motion estimation that may (i) calculate an array of absolute differences (e.g., 256 values for 16×16 pixels) for a macroblock per cycle, (ii) calculate multiple sums of absolute differences for a smallest block size, (iii) calculate the absolute differences and the sum of absolute differences (SAD) in difference circuits, (iv) build larger block-size SADs from smaller block-size SADs, (v) provide lookup tables to bias the variable block size SADS and the related motion vectors (e.g., to favor fewer, smaller motion vectors) for improved compression efficiency, (vi) reduce motion estimation process cycles, (vii) operate from a single pass through a reference search window, (viii) reduce an amount of temporary storage in the motion estimation processor as intermediate SAD values for partial block sizes may not be stored, (ix) input smaller block-size SADs into a larger block size SAD calculation logic without using any memory and/or (x) allow a motion estimation processor to support variable block size motion estimation with the addition of (number of blocks−1) comparators and registers.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
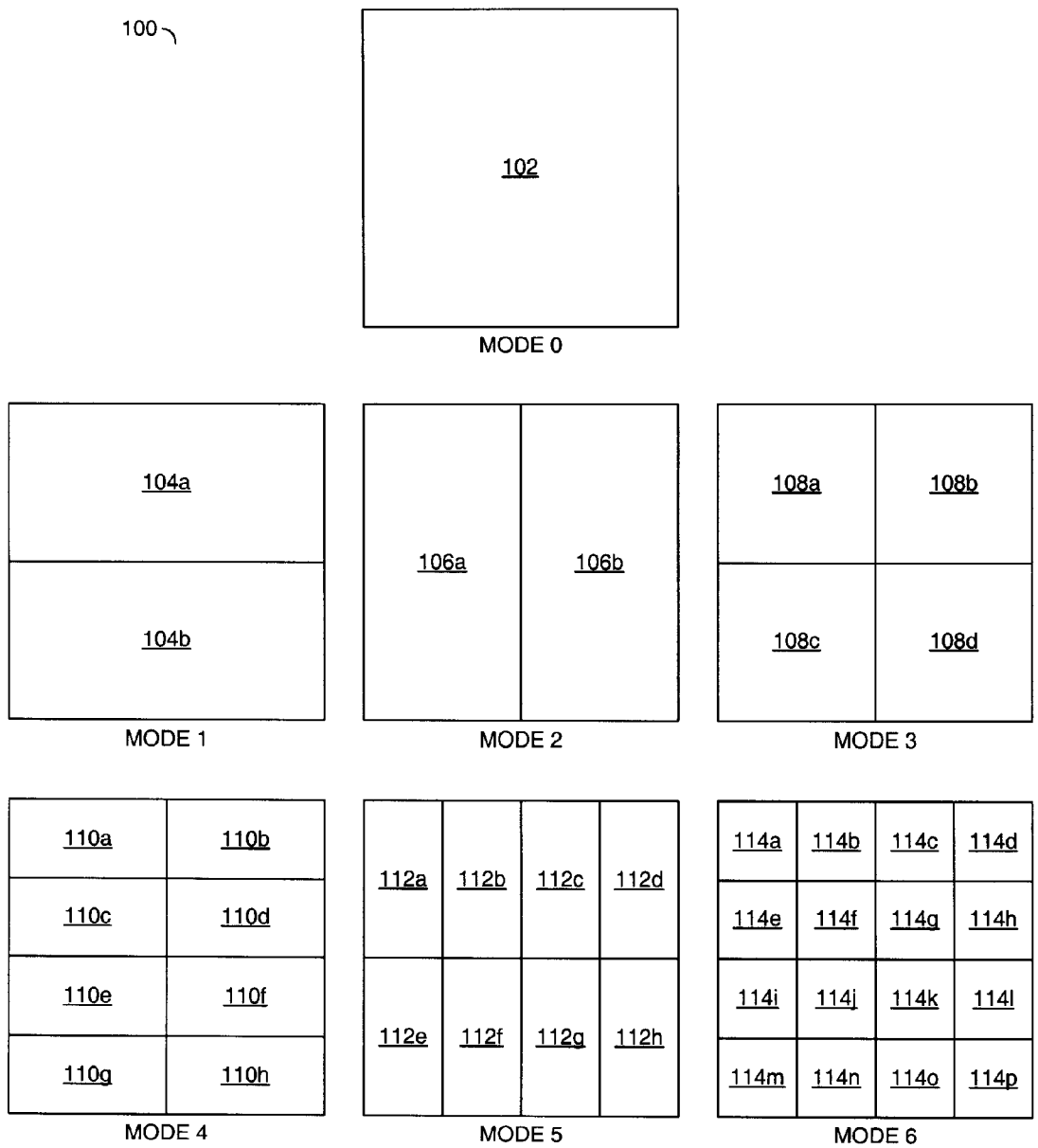
FIG. 1 is a block diagram of multiple partition modes of a macroblock.

Referring to FIG. 1, a block diagram of multiple partition modes of a macroblock 100 is shown. A first partition mode (e.g., MODE0) generally defines the macroblock 100 as a single (e.g., 16 H×16 V) block 102. Another partition mode (e.g., MODE1) may divide the macroblock 100 into two horizontal (e.g., 16 H×8 V) sub-blocks 104a-104b. A partition mode (e.g., MODE2) generally divides the macroblock 100 into two vertical (e.g., 8 H×16 V) sub-blocks 106a-106b. A fourth partition mode (e.g., MODE3) may divide the macroblock 100 into four square (e.g., 8 H×8 V) sub-blocks 108-108d. A partition mode (e.g., MODE4) generally divides the macroblock 100 into eight horizontal (e.g., 8 H×4 V) sub-blocks 110a-110h. Another partition mode (e.g., MODE5) may divide the macroblock 100 into eight vertical (e.g., 4 H×8 V) sub-blocks 112a-112h. A partition mode (e.g., MODE6) may divide the macroblock 100 into sixteen square (e.g., 4 H×4 V) sub-blocks 114a-114p.

Figure 2:
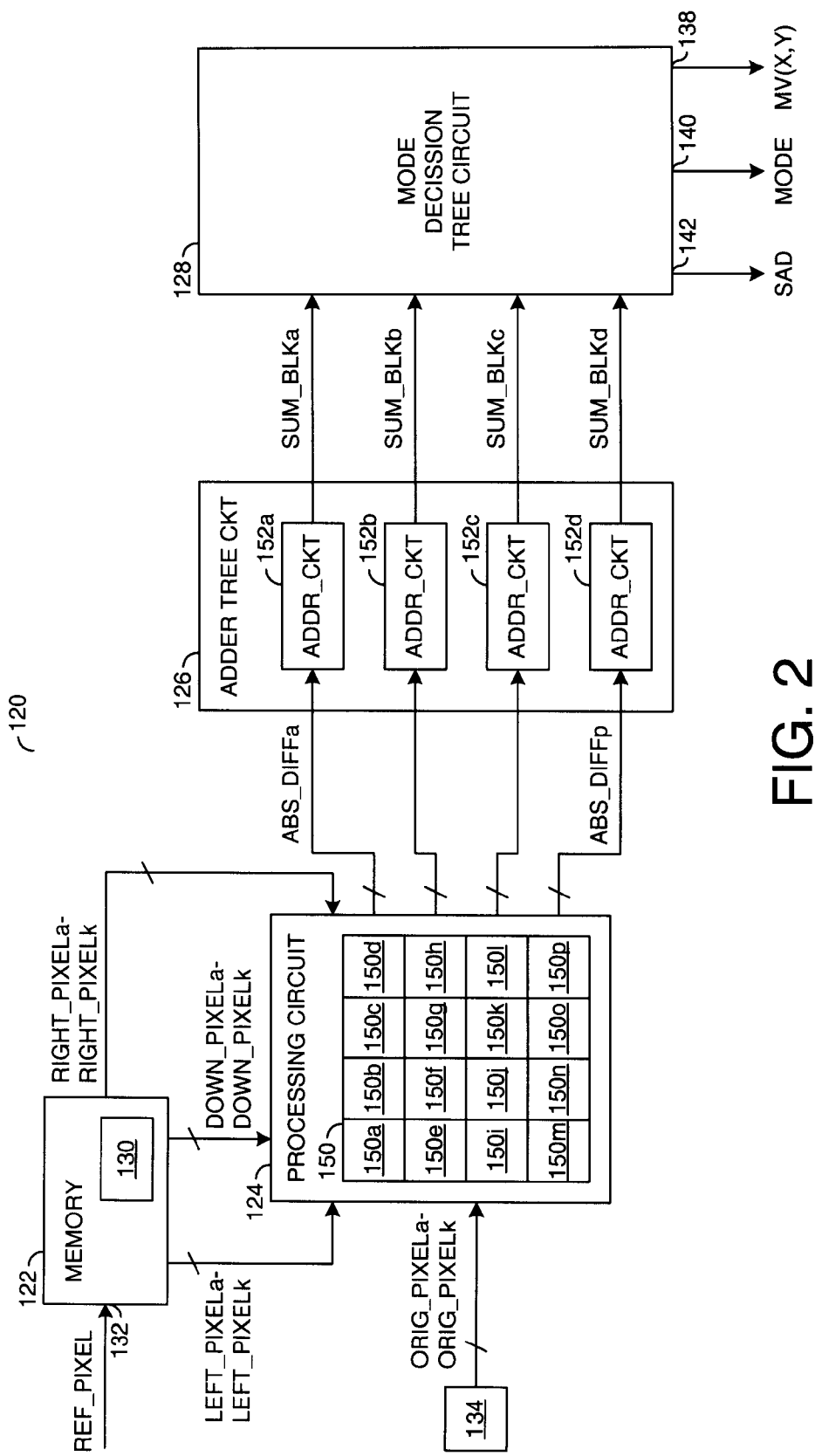
FIG. 2 is a block diagram of an apparatus in accordance with a preferred embodiment of the present invention.

Referring to FIG. 2, a block diagram of an apparatus 120 is shown in accordance with a preferred embodiment of the present invention. The apparatus (or system) 120 generally comprises a memory circuit (or module) 122, first circuit (or module) 124, a second circuit (or module) 126 and a third circuit (or module) 128. The apparatus 120 generally receives a signal (e.g., REF_PIXEL) carrying reference (or previous) blocks 130 of pixels at an input 132. The apparatus 120 may also receive a signal (e.g., ORIG_PIXEL) carrying current (or new) blocks 134 of pixels at an input 135. A signal (e.g., MV(x,y)) may be generated at an output 138 of the apparatus 120. A signal (e.g., MODE) may be generated at an output 140 of the apparatus 120. A signal (e.g., SAD) may be generated at an output 142 of the apparatus 120.

The signal REF_PIXEL may transfer reference frames that have been previously encoded and then decoded. The frames may represent one or more pictures used for motion estimation. Each frame generally comprises multiple reference blocks 130. Each reference block 130 may be implemented as a macroblock. The reference blocks 130 may be arranged in a single pixel resolution, a half pixel resolution, a quarter pixel resolution or the like.

The signal ORIG_PIXEL may transfer current frames to be encoded. Each current frame generally comprises multiple current blocks 134. Each current block 134 may be implemented as a macroblock.

The signal MODE may define the particular partition mode resulting in the best motion estimation for the current block 134. The signal MODE may identify seven different modes (e.g., MODE0-MODE6) in designs of the apparatus 120 that may be capable of partitioning each of the current blocks 134 into sixteen smallest sub-blocks (e.g., 114a-114p). The signal MODE may identify four different modes (e.g., MODE0-MODE3) in designs of the apparatus 120 that may be capable of partitioning each of the current blocks 134 into four 8×8 sub-blocks (e.g., 108a-108d). Other numbers of modes may be implemented to meet the criteria of a particular application.

The signal MV(x,y), or MV for short, may define one or more motion vectors for the current block 134 with respect to the reference frame or frames. The number of motion vectors within the signal MV may be defined by a particular partition mode determined to be a best mode for the current block 134. For example, if the apparatus 120 determines that MODE0 should be used for motion estimation, the signal MV may convey a single motion vector for the current block 134. If the apparatus 120 determines that MODE3 should be used for motion estimation, the signal MV may convey four motion vectors, one for each of the four sub-blocks (e.g., 108a-108d) within the current block 134.

The signal SAD may define a sum of absolute difference value for the best mode determined by the apparatus 120. The signal SAD may include a bias value and/or a cost value incorporated before determining the best mode. The bias value and the cost value may be determined from quantization parameters and the motion vectors.

The memory circuit 122 may be configured as an internal reference memory to store the reference blocks 130. The memory circuit 122 may include the input 132 to receive the reference blocks 130 via the signal REF_PIXEL. An interface may be provided between the memory circuit 122 and the first circuit 124 to present reference pixels in series and/or parallel to the first circuit 124.

The first circuit 124 may be implemented as a two-dimensional array of processing elements (or circuits) 150a-150p, referred to as a processing circuit 150 for short. Each processing element 150a-150p may be configured to calculate an absolute difference between a current pixel from a current block 134 and a respective reference pixel from within a search area. The absolute difference values may be presented in a signal (e.g., ABS_DIFF) In one embodiment, the array may be logically and/or physically arranged as a 16 by 16 matrix of 256 processing elements 150a-150p generating 256 signals ABS_DIFFa-ABS_DIFFp substantially simultaneously. Other arrangements may be implemented for the processing circuit 150 to meet the criteria of a particular application.

The current pixels may be received by the processing circuit 150 along a first edge (e.g., a left edge) of the array via the signals ORIG_PIXEL (e.g., ORIG_PIXELa-ORIG_PIXELk). Once loaded into the first column of processing elements 150a-150p, columns of the current pixels may be shifted through to the other columns of processing elements 150a-150p in the array. Multiple signals (e.g., LEFT_PIXELa-LEFT_PIXELk) may carry a column of the reference pixels from the memory circuit 122 to the processing elements 150a-150p along the first edge of the array. Additional signals (e.g., RIGHT_PIXELa-RIGHT_PIXELk) may carry a row of the reference pixels from the memory circuit 122 to the processing elements 150a-150p along a second edge (e.g., a top edge) of the array. A number of signals (e.g., DOWN_PIXELa-DOWN_PIXELk) may carry another column of the reference pixels from the memory circuit 122 to a third edge (e.g., a right edge) of the array. As with the current pixels, a column/row of reference pixels received along an edge of the array may be shifted through to other columns/rows in the array until each processing element 150a-150p has received a current pixel and a respective reference pixel. By shifting columns and rows of the reference pixels into the processing circuit 124, a current block 134 represented by the loaded current pixels may be moved through the search window of reference pixels, a single position at a time, by loading a new column or a new row of reference pixels, one column or row at a time.

The second circuit 126 may be implemented as an adder tree circuit. The adder tree circuit 126 is generally operational to add the absolute difference signals ABS_DIFFa-ABS_DIFFp to generate multiple summation signals (e.g., SUM_BLKa-SUM_BLKd). The adder tree circuit 126 generally comprises multiple adder circuits (or modules) 152a-152d. Each of the adder circuits 152a-152d may be operational to generate one of the sum signals SUM_BLKa-SUM_BLKd.

The third circuit 128 may be implemented as a mode decision tree circuit. The mode decision tree circuit 128 is generally operational to add the sum signals SUM_BLKa-SUM_BLKd in several different combinations to generate a sum of absolute difference (SAD) value for each of several modes corresponding to the various block sizes. The mode decision tree circuit 128 may also be operational to add costs and biases to the SAD values, maintain the minimum or smallest SAD per mode and determine a best mode (e.g., lowest SAD). The mode decision tree circuit 128 generally presents the signal MODE to indicate the best mode determined for the current block 134. The motion vector signal MV may be presented by the mode decision tree circuit 128 with one or more motion vectors corresponding to the best mode. The signal SAD may be presented by the mode decision tree circuit 128 with a value for the sum of absolute differences corresponding to the best mode.

Figure 3:
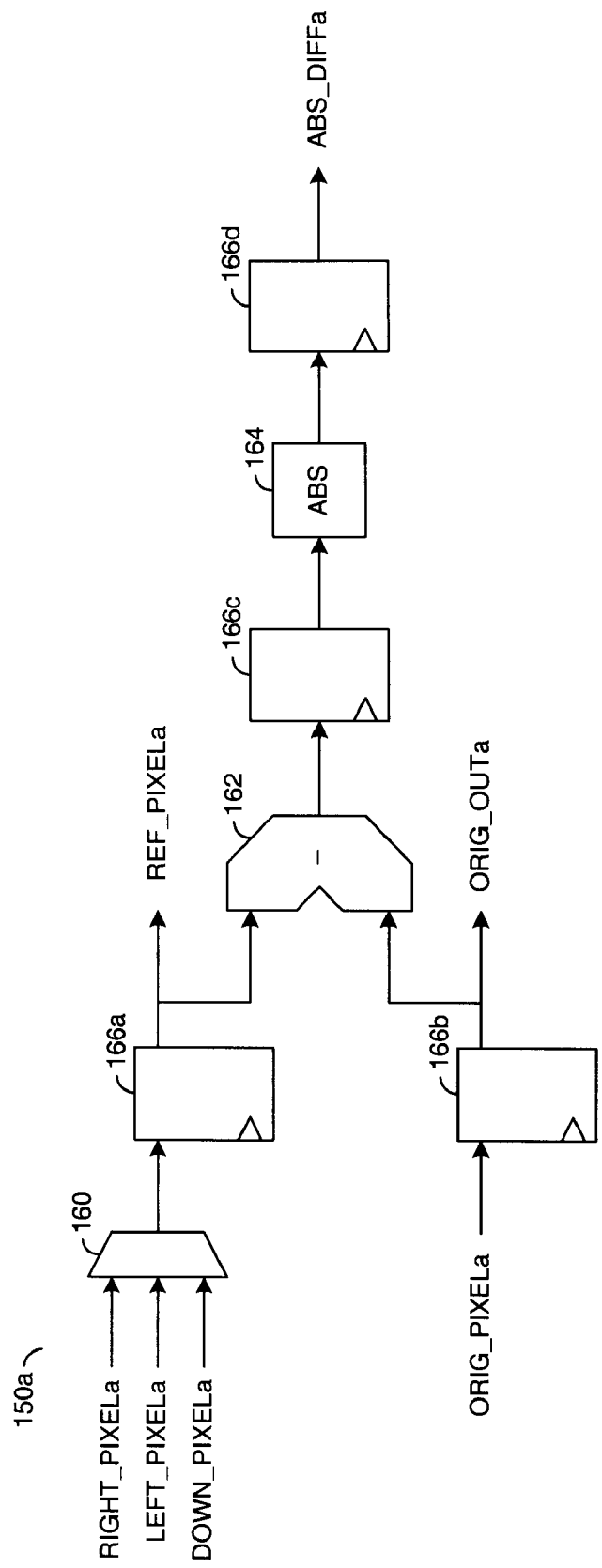
FIG. 3 is a block diagram of an example implementation of a processing element circuit.

Referring to FIG. 3, a block diagram of an example implementation of the processing element circuit 150a is shown. The processing element 150a generally comprises a multiplexer 160, a subtraction circuit 162, an absolute value circuit 164 and multiple registers 166a-166d. The multiplexer 160 may receive each of the signals LEFT_PIXELa, RIGHT_PIXELa and DOWN_PIXELa. Depending on the location of the processing element circuit 150a within the array of the processing circuit 124, the signals LEFT_PIXELa, RIGHT_PIXELa and DOWN_PIXELa may be received from an adjacent processing element circuit 150b-150p or the memory circuit 122.

The multiplexer 160 may route the signals LEFT_PIXELa, RIGHT_PIXELa and DOWN_PIXELa to the register 166a, one at a time, based upon the direction the reference pixels are being shifted through the array. The register 166a may present the stored reference pixel to other adjacent (e.g., left, right and down) processing elements in a signal (e.g., REF_PIXELa). The above arrangement generally allows the reference pixels to be shifted through the array left-to-right, right-to-left and top-to-bottom. Other shifting arrangements may be implemented to meet the criteria of a particular application.

The register 166b may receive and store a current pixel from a signal (e.g., ORIG_PIXELa). Depending on the position of the processor element 150 within the array, the signals ORIG_PIXELa may be received from external to the array or from an adjacent processor element 150b-150p. The register 166b may present the stored current pixel to an adjacent processing element 150b-150p (e.g., left) in a signal (e.g., ORIG_OUTa). The above arrangement generally allows the current pixels to be shifted through the array from left-to-right. Other shifting arrangements may be implemented to meet the criteria of a particular application.

The subtractor circuit 162 may be operational to generate a difference value in a signal based on the values of the reference pixel stored in the register 166a and the current pixel stored in the register 166b. Calculation of the difference value may be either the reference pixel value minus the current pixel value or the current pixel value minus the reference pixel value. The difference value may be stored in the optional register 166c.

The absolute value circuit 164 may be operational to generate an absolute difference value from the difference value. The absolute difference value may be stored in the optional register 166d. The register 166d may present the absolute difference value in a signal (e.g., ABS_DIFFa) to the adder tree circuit 126.

Figure 4:
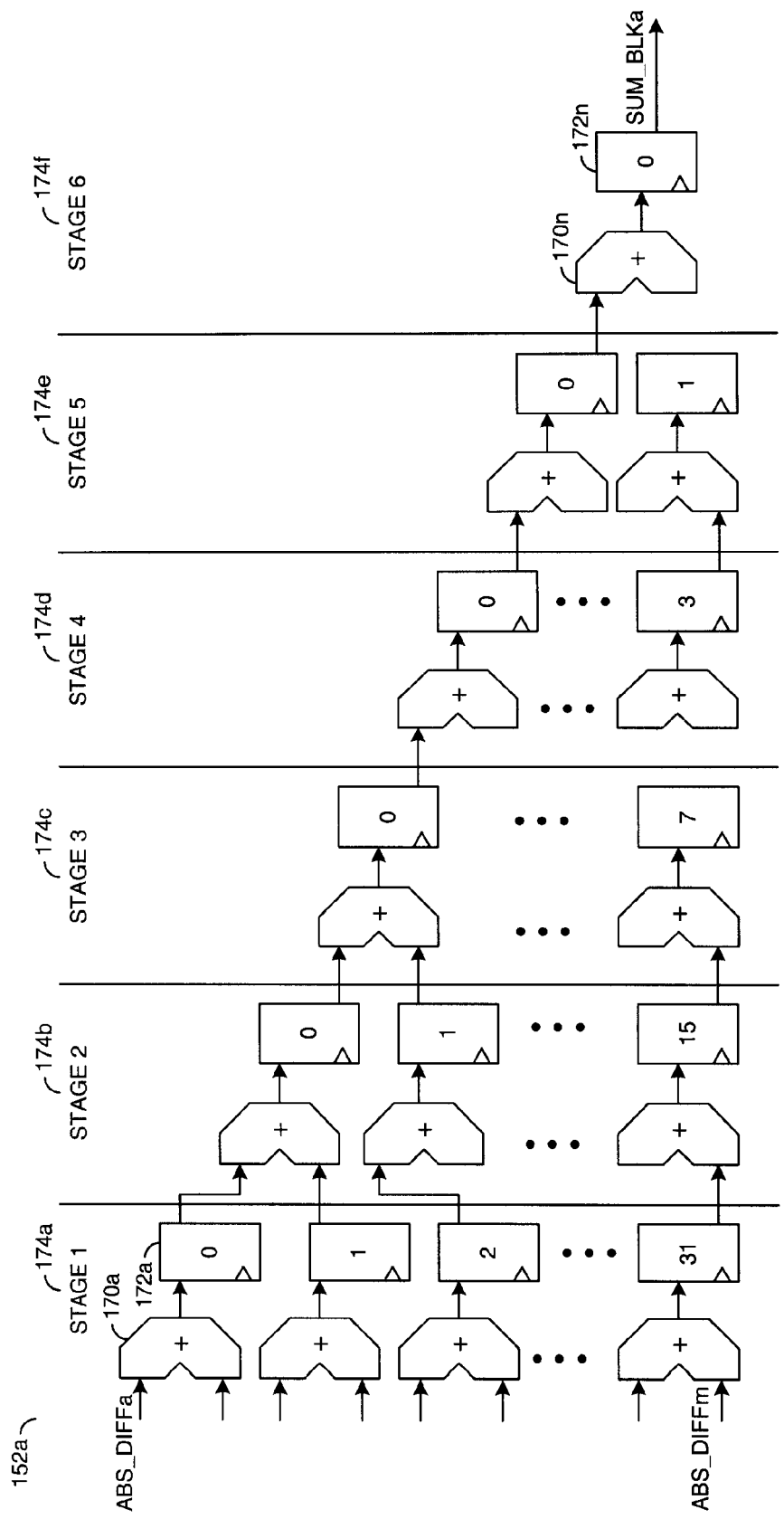
FIG. 4 is a block diagram of an example implementation of an adder circuit.

Referring to FIG. 4, a block diagram of an example implementation of the adder circuit 152a is shown. The adder circuit 152a generally comprises multiple addition circuits 170a-170n and multiple registers 172a-172n. The addition circuits 170a-170n and the registers 172a-172n may be arranged as several stages 174a-174f. The first stage 174a may comprise a portion of the addition circuits 170a-170n and a corresponding number of registers 172a-172n. In general, a single addition circuit 170a-170n may be implemented in the first stage 174a for every two absolute difference signals ABS_DIFFa-ABS_DIFFp received (e.g., an integer fraction of the total). Each successive stage 174b-174f generally has half as many addition circuits 170a-170n and registers 172a-172n as the previous stage 174a-174e. The final stage 174f may have a single addition circuit 170n and a single register 172n. The registers 172a-172n may provide timing control for propagating the absolute difference values through the adder tree circuit 126.

The illustrated adder circuit 152a generally has 64 inputs for receiving a 64-signal portion of the 256 signals ABS_DIFFa-ABS_DIFFm. Therefore, the adder circuit 152a may be operational to generate a sum of absolute difference value for an 8 H×8 V block of pixels. Therefore, four adder circuits 152a-152d may be implemented to sum all 256 signals ABS_DIFFa-ABS_DIFFp into four sum of absolute difference values expressed in the signals SUM_BLKa-SUM_BLKd. As such, the smallest block, sub-block or partition size supported by the example implementation of the adder circuit 152a may be 8 H×8 V. Larger block sizes, such as 8 H×16 V, 16 H×8 V and 16 H×16 V may be supported by adding SAD values for the 8 H×8 V blocks in the mode decision tree circuit 128. From the four signals SUM_BLKa-SUM_BLKd, the mode decision tree circuit 128 may generate nine SAD values for nine possible partitions of the 16×16 block of pixels.

To support a 4 H×4 V block, an adder circuit 152a summing 16 of the signals ABS_DIFFa-ABS_DIFFp would generally be sufficient. Therefore, the adder tree circuit 126 may comprise 16 adder circuits 152a-152d and generate 16 sum signals SUM_BLKa-SUM_BLKd. Assuming a 16×16 pixel current block 134, the mode decision tree circuit 128 may combine the 16 signals SUM_BLKa-SUM_BLKd into 41 SAD values in support of all of the block sizes defined by the H.264 specification ("Advanced Video Coding", International Telecommunication Union Telecommunication Standardization Sector, Geneva, Switzerland). Other configurations of the adder circuits 152a-152d and the adder tree circuit 126 may be implemented to meet the criteria of a particular application.

Figure 5:
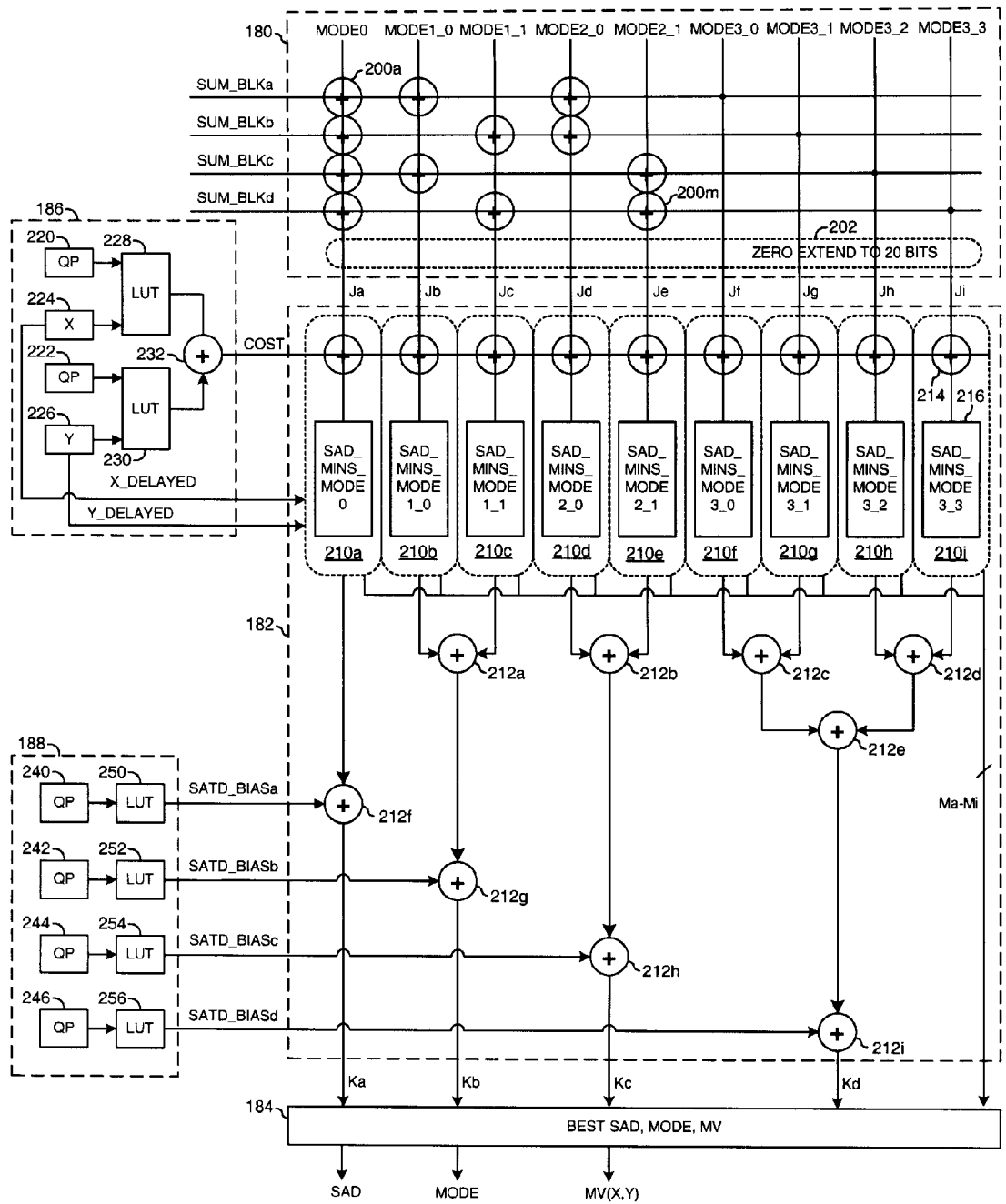
FIG. 5 is a block diagram of an example implementation of a mode decision tree circuit.

Referring to FIG. 5, a block diagram of an example implementation of the mode decision tree circuit 128 is shown. The mode decision tree circuit 128 generally comprises an add circuit (or module) 180, a storage circuit (or module) 182, a decision circuit (or module) 184, a first bias circuit (or module) 186 and a second bias circuit (or module) 188. The adder circuit 180 may generate multiple intermediate signals (e.g., Ja-Ji), one for each possible partition, based on the signals SUM_BLKa-SUM_BLKd. The storage circuit 182 may examine the signals Ja-Ji and store each minimum SAD value found for the respective partition over the search window and the corresponding motion vectors. The lowest SAD values may be presented to the select circuit 184 via intermediate signals (e.g., Ka-Kd). Each of the motion vectors associated with the respective lower SAD value for a partition may also be presented to the select circuit 184 via intermediate signals (e.g., Ma-Mi).

The select circuit 184 may be operational to determine the best or lowest SAD value among the signals Ka-Kd. The lowest SAD value generally indicates a best match for the partitions of the current block 134 within the search window of the reference frame or frames. The select circuit 184 may present the lowest SAD value found for the current block 134 in the signal SAD. The partition mode associated with the lowest SAD may be presented by the select circuit 184 in the signal MODE. The one or more motion vectors corresponding to the partition mode may also be presented by the select circuit 184 in the signal MV.

The first bias circuit 186 may generate a signal (e.g., COST) conveying a cost (or bias) value. Two signals (e.g., X_DELAYED and Y_DELAYED) may be generated by the first bias circuit 186 indicating the proposed motion vector associated with the cost value. The second bias circuit 188 may generate multiple signals (e.g., SATD_BIASa-SATD_BIASd) for conveying individual bias values for the respective SAD values. The first bias circuit 186 and the second bias circuit 188 may consider a quantization parameter (QP), a magnitude of the motion vector components and the block size in determining the cost and bias values. While variable block size motion estimation generally provides better estimation of small and irregular motion fields than fixed block size motion estimation, supporting different block sizes uses more bits in the bitstream for signaling the size of the blocks and for encoding motion vectors at smaller block sizes. The lookup tables (LUTs) within the first bias circuit 186 and the second bias circuit 188 generally permit a rate-distortion tradeoff between block size/numbers motion vectors (e.g., increasing bit rate) and prediction error (e.g., reducing bit rate).

The adder circuit 180 generally comprises multiple adders 200a-200n and a circuit 202. The adders 200a-200n may be arranged to sum various combinations of the individual signals SUM_BLKa-SUM_BLKd to calculate an initial SAD value for each possible partition (e.g., MODE0, MODE1_0, MODE1_1, MODE2_0, MODE2_1, MODE3_0, MODE3_1, MODE3_2 and MODE3_3). The circuit 202 may be operational to extend the initial SAD values to a predetermined bit length (e.g., 20 bits).

The storage circuit 182 generally comprises multiple modules 210a-210i and a plurality of adders 212a-212i. In general, a module 210a-210i may be implemented for each partition. Each module 210a-210i generally comprises an adder 214 and a comparator/register 216. The adder 214 may add the cost value to the initial SAD value. The comparator/register 216 is generally operational to compare each SAD value received with a minimum SAD value stored internally. If the newly received SAD value is less than an existing stored SAD value, (i) the new SAD value is stored in place of the existing SAD value and (ii) the corresponding motion vector (e.g., from signals X_DELAYED and Y_DELAYED) is stored in place of an existing motion vector. Therefore the modules 212a-212i may save the best SAD values and the motion vectors found over the whole search area, resulting in an additional cost of only 8 comparator/register elements 216 to support variable block size motion estimation. The adders 212a-212e may be arranged to add the minimum SAD values for the non-mode-zero partitions to generate a single SAD value for the entire current block 134 in each mode (e.g., MODE0, MODE1, MODE2 and MODE3). The adders 212f-212i may be arranged to add the bias values from the signals SATD_BIASa-SATD_BIASd to the respective SAD values to generate the signals Ka-Kd.

The first bias circuit 186 generally comprises a block 220, a block 222, a block 224, a block 226, a lookup table 228, a lookup table 230 and an adder 232. The blocks 220 and 222 may present a quantization parameters for the x and y motions. The block 224 and 226 may present the x and y components of the motion vector currently being assessed. The lookup tables 228 and 230 may generate intermediate values associated with each component of the present motion vector being considered. The adder 232 may add the intermediate values from the LUTs 228 and 230 to generate the cost value in the signal COST.

The second bias circuit 188 generally comprises a block 240, a block 242, a block 244, a block 246, a lookup table 250, a lookup table 252, a lookup table 254 and a lookup table 256. The blocks 240-246 may each be configured to generate a quantization parameter for a particular major mode. Each lookup table 250-256 may convert the quantization parameters into the bias values within the signals SATD_BIASa-SATD_BIASd.

The present invention may be implemented in any H.264 encoder with a motion estimation processor. The particular design may be adjusted according to the smallest partition size to be considered and the number of possible partitions available. Also, the present invention may be applied to encoders with motion estimation processors for any other digital video compression standards that allow variable block-size motion estimation (e.g., MPEG-4 Part 2 and H.263+).

The present invention may also be implemented by the preparation of ASICs, FPGAs, or by interconnecting an appropriate network of conventional component circuits (such as conventional circuit implementing a state machine), as described herein, modifications of which will be readily apparent to those skilled in the art(s). As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a first circuit configured to generate a plurality of sum values by adding a plurality of pixel difference values between a current block of a current picture and a reference block of a reference picture, each one of said sum values corresponding to a different one of a plurality of smallest partitions of said current block, said pixel difference values being received in parallel by said first circuit; and
   a second circuit configured to (i) generate a plurality of intermediate values from said sum values, each one of said intermediate values corresponding to a different one of a plurality of possible partitions of said current block, (ii) store a plurality of lowest values among said intermediate values as said current block is moved through a search window and (iii) generate a motion signal conveying at least one motion vector based on said lowest values, said sum values being received in parallel by said second circuit from said first circuit.

2. The apparatus according to claim 1, wherein said possible partitions comprise (i) one large square partition, (ii) two horizontal rectangular partitions, (iii) two vertical rectangular partitions and (iv) four small square partitions.

3. The apparatus according to claim 1, wherein said second circuit is further configured to (i) generate a cost value based on a quantization parameter and (ii) add said cost value to each of said intermediate values.

4. The apparatus according to claim 1, wherein said second circuit is further configured to (i) generate a cost value based on a motion vector magnitude of said current block in said search window and (ii) add said cost value to each of said intermediate values.

5. The apparatus according to claim 1, wherein said second circuit is further configured to generate a plurality of mode values by summing said lowest values in each of a plurality of partition modes of said current block, one of said mode values corresponding to each respective one of said partition modes.

6. The apparatus according to claim 1, wherein said second circuit is further configured to generate a plurality of bias values based on a quantization parameter.

7. The apparatus according to claim 1, wherein said second circuit is further configured to generate a mode signal conveying a particular one of a plurality of partition modes corresponding to said motion vector.

8. The apparatus according to claim 1, wherein said second circuit is further configured to generate a sum signal conveying a sum of absolute difference value corresponding to said motion vector.

9. The apparatus according to claim 1, wherein said second circuit is further configured to store a plurality of motion vectors, one of said motion vectors corresponding to each respective one of said lowest values when stored.

10. The apparatus according to claim 1, wherein said smallest partition comprises a 4×4 pixel partition.

11. A method for motion estimation, comprising the steps of:
   (A) generating a plurality of sum values in a first circuit by adding a plurality of pixel difference values between a current block of a current picture and a reference block of a reference picture, each one of said sum values corresponding to a different one of a plurality of smallest partitions of said current block, said pixel difference values being received in parallel by said first circuit;

(B) generating a plurality of intermediate values from said sum values in a second circuit, each one of said intermediate values corresponding to a different one of a plurality of possible partitions of said current block, said sum values being received in parallel by said second circuit from said first circuit;

(C) storing a plurality of lowest values among said intermediate values as said current block is moved through a search window; and (D) generating a motion signal conveying at least one motion vector based on said lowest values.

12. The method according to claim 11, wherein said possible partitions comprise (i) one large square partition, (ii) two horizontal rectangular partitions, (iii) two vertical rectangular partitions and (iv) four small square partitions.

13. The method according to claim 11, further comprising the steps of:
generating a cost value based on a quantization parameter; and
adding said cost value to each of said intermediate values.

14. The method according to claim 11, further comprising the steps of:
generating a cost value based on a motion vector magnitude of said current block in said search window; and
adding said cost value to each of said intermediate values.

15. The method according to claim 11, further comprising the step of:
generating a plurality of mode values by summing said lowest values in each of a plurality of partition modes of said current block, one of said mode values corresponding to each respective one of said partition modes.

16. The method according to claim 11, further comprising the step of:
generating a plurality of bias values based on a quantization parameter.

17. The method according to claim 11, further comprising the step of:
generating a mode signal conveying a particular one of a plurality of partition modes corresponding to said motion vector.

18. The method according to claim 11, further comprising the step of:
generating a sum signal conveying a sum of absolute difference value corresponding to said motion vector.

19. The method according to claim 11, further comprising the step of:
storing a plurality of motion vectors, one of said motion vectors corresponding to each respective one of said lowest values when stored.

20. A circuit comprising:
means for generating a plurality of sum values by adding a plurality of pixel difference values between a current block of a current picture and a reference block of a reference picture, each one of said sum values corresponding to a different one of a plurality of smallest partitions of said current block, said pixel difference values being received in parallel by said means for generating said sum values; and means for (i) generating a plurality of intermediate values from said sum values, each one of said intermediate values corresponding to a different one of a plurality of possible partitions of said current block, (ii) storing a plurality of lowest values among said intermediate values as said current block is moved through a search window and (iii) generating a motion signal conveying at least one motion vector based on said lowest values, said sum values being received in parallel by said means for generating said intermediate values from said means for generating said sum values.

21. The apparatus according to claim 6, wherein said second circuit is further configured to add said bias values to a plurality of mode values.

22. The apparatus according to claim 21, wherein each one of said bias values corresponding to a respective one of said mode values.

23. The method according to claim 16, further comprising the step of:
adding said bias values to a plurality of mode values.

24. The method according to claim 23, wherein each one of said bias values corresponding to a respective one of said mode values.

* * * * *